United States Patent Office 3,078,561
Patented Feb. 26, 1963

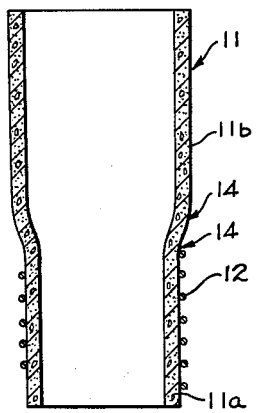
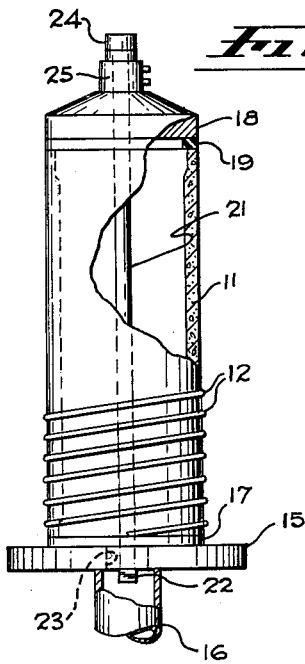
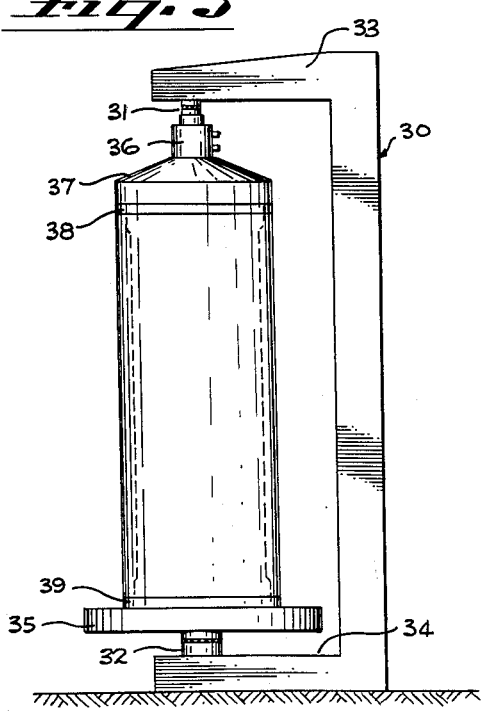
ALFRED B. SZULC
INVENTOR

3,078,561
METHOD OF MAKING PRESTRESSED CONCRETE PIPE
Alfred B. Szulc, Los Angeles, Calif., assignor to American Pipe and Construction Co., South Gate, Calif., a corporation of Delaware
Filed Feb. 23, 1960, Ser. No. 10,308
2 Claims. (Cl. 29—452)

This invention has to do generally with methods of making reinforced concrete pipe of the type in which wire of high tensile strength is wound around the pipe under tension and anchored in place to effectively prestress the pipe before it is placed in use and thereby enable it to withstand substantial internal pressures.

Generally speaking there are two types of concrete pipe which are reinforced by an external reinforcing wire under tension. One type comprises a concrete pipe body which includes a metal cylinder embedded in the body. The other type comprises a concrete pipe body either non-reinforced or having longitudinal and circular reinforcing members therein, usually disposed in a cage-like form. In manufacture, the pipe body is wrapped after the concrete has cured sufficiently to enable it to substantially withstand the compressive effect of the tensioned winding. In the case of the second type of pipe mentioned above wherein there is no continuous cylindrical metal member employed in the body of the pipe which would prevent leakage of fluid through the pipe wall when the pipe is placed in use, a serious problem is presented by the winding of the tensioned reinforcement wire about the body since this causes cracks to form which may later permit escape of fluid from the pipe especially where internal hydrostatic pressures are substantial. Thus when a concrete pipe core is progressively wound from one end during the so-called prestressing process, the compressive force of the wire reduces the diameter of the pipe so that there results a longitudinal bending moment in the concrete wall. The winding stresses resulting from this longitudinal bending will be greater than the tensile strength of the concrete and consequently circumferential cracks form in the concrete core. As previously pointed out it is essential to eliminate this cracking during manufacture of pipe which does not have an integral or internal metal cylinder since leakage will generally occur at these cracks when the pipe is placed in use.

To prevent the induced cracking of the pipe as outlined above, many manufacturers resort to the use of permanent, longitudinal prestress applied by means of longitudinal tensioned wires of high tensile steel embedded in the wall of the pipe core. These wires are held in tension during the casting of the concrete and until it has cured sufficiently, or they are tensioned and anchored after the concrete has cured sufficiently, provided the bond between the wires and concrete is prevented. However this method of manufacture is exceedingly time consuming and costly both in materials and labor.

Therefore, it is an object of the invention to provide a simplified, novel, improved and relatively inexpensive method of making prestressed pipe of the type indicated wherein no cylindrical internal metal shell is employed which results in a product substantially free of the objectionable cracks hereinbefore referred to.

A further object is to provide a novel method of making pipe of the type indicated wherein the concrete pipe body is temporarily compressed from end to end and, while so compressed, wound with a reinforcing wire under tension.

There and other objects will be apparent from the drawing and the following description. Referring to the drawing:

FIG. 1 is a sectional view of a concrete pipe body partially helically wound with circumferential reinforcing wire under tension, the view being somewhat diagrammatic in that the compressive effect of the wire on the body is exaggerated;

FIG. 2 is an elevational view partly in section of means for supporting and stressing a concrete body longitudinally during winding of the reinforcing wire; and FIG. 3 is an elevational view of another form of apparatus for the same purpose as the apparatus shown in FIG. 2.

More particularly describing the invention and referring to FIG. 1, as previously pointed out if a hollow concrete body 11, such as one which is to form a pipe body, is progressively wound from one end to the other with wire 12 under tension, the wall of the pipe will be progressively compressed as indicated by the portion 11a as compared to its original size as shown by the portion 11b. In FIG. 1 the amount of this reduction in the diameter, or compressive effect, has been greatly exaggerated for the purpose of illustration, but it is, nevertheless, a measurable quantity. In consequence there is a tendency for the concrete to crack circumferentially in the region 14 just ahead of the wire being wound thereon. Since the induced tensile stresses producing cracks in the region 14 are temporary insofar as they vanish at any given section after winding progresses away from it, it is sufficient to provide means for temporarily prestressing the pipe body 11 longitudinally so as to place it in compression from end to end in order to obviate the formation of such cracks. Various means may be used to accomplish this. However in FIG. 2, I show one means which comprises a turntable 15 forming part of a winding machine 16 which is only fragmentarily shown. The cured or substantially cured pipe body 11 is placed upon a pad 17 which rests on the turntable. At the upper end of the pipe body I provide a rigid, prestressing head 18 with a suitable pad 19 between the two. The pads 17 and 19 may be made of hard rubber or other suitable material adapted to protect the ends of the pipe. In order to stress the pipe by placing it in compression longitudinally of itself I provide a centrally disposed tension rod 21 and this is shown as having a head 22 on its lower end beneath the turntable 15. The head 22 may be elongated in one direction so that it may be releasably anchored beneath the turntable by passing it through an elongated slot 23 therein and turning it 90° so that it is out of alignment with the slot.

For the purpose of tensioning the rod 21 the upper end thereof is fitted with a head 24 which may be either detachably or fixedly secured thereto. Between the head 24 and the head 18 I provide a jack 25 adapted to pass the rod 21. For ease of operation, I prefer to employ a hydraulic jack, but any other type might be used. It will be apparent that expansion of the jack between the rod head 24 and the prestressing head 18 will tension the rod 21 and serve to compress the pipe body 11 between the turntable 15 and head 18. I have found that a longitudinal stress in the concrete wall of the order of 300 p.s.i. is sufficient for the purpose. While the pipe body is maintained so stressed the reinforcing wire 12 is wrapped helically about the body 11 under tension by conventional means, the wire being shown partially wrapped in FIG. 2. After the winding has been completed, and the wire anchored in place, the rod 21 may be released of tension and the parts disassembled to enable removal of the reinforced pipe body from the turntable.

In FIG. 3 I show a somewhat different form of apparatus for accomplishing the results wherein a yoke-like frame means 30 of rigid character is provided with two thrust bearings 31 and 32 upon its arms 33 and 34 respectively. These support the turntable 35, upon which the body rests, and an expandable jack member 36 of any suitable type. A head 37 is provided between the jack and the end of the pipe with pads 38 and 39 provided at the ends of the pipe body to protect the same and uniformly distribute the force thereto. By expanding the jack 36 the pipe body is placed in compression so that it may be wound with the reinforcing wire.

It will be apparent that, essentially the method comprises temporarily stressing the pipe body (or other object) by placing it in compression in the direction of the axis about which the reinforcing wire is to be wound by means external of the wall of the pipe body itself and maintaining the body in compression while the wire is wound. Subsequently the force which has been used to place the body in compression is relieved. Thus I am able to eliminate the expensive internal permanent reinforcement of the pipe body or the like by the conventional pre-tensioned or post-tensioned longitudinal rods embedded in the wall of the pipe body.

Although I have shown and described preferred forms of the invention I contemplate that various changes and modifications can be made without departing from the scope of the invention.

I claim:

1. In the manufacture of prestressed concrete pipe, the method comprising the steps of providing a concrete pipe body in substantially cured condition, stressing said pipe body longitudinally by the application of force to the ends of the body by means wholly independent of the body in a direction to place the concrete in compression longitudinally of the body to the order of about 300 p.s.i., securing one end of a reinforcement wire to one end of the pipe body and helically winding the wire from said one end of the pipe body to the other end thereof under tension of such magnitude as to cause undesirable circumferential cracking of said pipe body in the absence of said compressive force being applied thereto, securing the other end of said wire to said other end of said pipe body while maintaining the tension under which the same was wound thereon, and thereafter relieving the applied force from the ends of the pipe body.

2. In the manufacture of prestressed concrete pipe, the method comprising the steps of providing a tubular concrete body in substantially cured condition, placing the concrete body in compression axially by applying compressive force to the ends of said body in an amount sufficient to cause the same to withstand without cracking stresses induced by helically winding a reinforcement wire about the body under such tension as would otherwise cause circumferential cracks in the body, securing one end of a reinforcement wire to one end of the body and helically winding the wire from said one end of the body to the other end thereof under tension of such magnitude as to cause undesirable circumferential cracking of the body in the absence of said compressive force, securing the other end of said wire to the other end of said body while maintaining the tension under which the same was wound, and thereafter relieving the applied compressive force from the body.

References Cited in the file of this patent

UNITED STATES PATENTS

| | | |
|---|---|---|
| 1,965,748 | Mitchell | July 10, 1934 |
| 2,001,237 | Bille | May 14, 1935 |
| 2,011,463 | Vianini | Aug. 13, 1935 |
| 2,348,765 | Trickey et al. | May 16, 1944 |
| 2,569,612 | Laurent | Oct. 2, 1951 |
| 2,706,498 | Upson | Apr. 19, 1955 |